United States Patent [19]
Kastner et al.

[11] 3,753,135
[45] Aug. 14, 1973

[54] PULSE WIDTH DISCRIMINATOR

[75] Inventors: Gerhard Kastner, Pfungstadt; Klaus Lohman, Langen, both of Germany

[73] Assignee: Fernseh GmbH, Darmstadt, Germany

[22] Filed: Oct. 26, 1971

[21] Appl. No.: 192,239

[30] Foreign Application Priority Data
Oct. 27, 1970  Germany.................. P 20 52 600.5

[52] U.S. Cl.................. 329/106, 328/111, 329/126
[51] Int. Cl. ................................................. H03k 9/08
[58] Field of Search........................... 329/106, 126; 328/111; 307/234; 325/142

[56] References Cited
UNITED STATES PATENTS
| | | | |
|---|---|---|---|
| 3,379,981 | 4/1968 | Humpherys..................... | 329/106 X |
| 3,473,130 | 10/1969 | Briggs............................ | 328/111 X |
| 3,519,932 | 7/1970 | Baum et al................... | 329/106 UX |

FOREIGN PATENTS OR APPLICATIONS
1,038,111  9/1958  Germany ........................... 329/106

Primary Examiner—Alfred L. Brody
Attorney—Carroll B. Quaintance et al.

[57] ABSTRACT

An output pulse connects a timing pulse source to a first counter. A first flip flop produces a 1 level when a predetermined count is exceeded. A negative transition of the input pulse interrupts the timing pulses, resets the first counter and places the first flip flop at 0.

A second flip flop is shifted to a 1 level by a negative transition of the first flip flop. At the same time a second counter begins counting timing pulses. The second counter resets the second flip flop to zero, when a predetermined count is reached.

1 level outputs of both flip flops are combined in an OR gate.

Short input pulses reset the first counter before any 1 levels are achieved.

Wide input pulses are transmitted, delayed by an interval corresponding to the selection width and to the predetermined count.

10 Claims, 2 Drawing Figures

PULSE WIDTH DISCRIMINATOR

BACKGROUND OF THE INVENTION

The invention concerns a pulse width discriminator. When an input pulse is present, an output pulse occurs only after a predetermined time. The output pulse is extended by the predetermined time beyond the end of the input impulse. In the case of input impulses that are shorter than the predetermined time, no output impulses occur. In the case of input impulses that are longer than the predetermined time, output impulses are transmitted with widths of which correspond to widths of the input impulses.

Known pulse width discriminators perform the function of differentiating between pulses depending upon their lengths. In the case of the pulses exceeding a certain width, pulses are transmitted with widths which correspond to those of the input pulses. The object of the present invention is to provide an impulse width discriminator in which a predetermined time can be established with a degree of precision that is adequate for measuring purposes.

SUMMARY OF THE INVENTION

The invention is characterized in that a first counter is provided to which timing pulses are passed during the occurrence of an input pulse. Depending upon a presettable numerical value, the first counter sends a pulse determining the commencement of the output pulse. A second counter, which can be preset to the same numerical value, is started at the end of those input impulses which exceed the predetermined time. The second counter sends a pulse determining the end of the output pulse when the preset numerical value is reached.

Known pulse width discriminators establish predetermined times with the aid of analog integrators and threshold switches. The pulse width discriminator of the present invention offers the advantage that after the discriminator has been manufactured or after repair operations have been carried out, no adjustment operations are required, apart from the tuning of the timing generator. Furthermore, given a sufficiently high timing frequency, a very high resolving power can be achieved. A very high long-term constancy is ensured by means of the frequency constancy of simple generators, which is known to be high. Even in the event of fluctuations in the operating voltage, the changes in the predetermined times are confined to extremely narrow limits. Furthermore, counters can be readily preset on a digital basis, so that the pulse width discriminator of the invention can be employed with particular advantage in programmable equipment.

BRIEF DESCRIPTION OF THE DRAWING

The invention will now be described in more detail by reference to the drawings which illustrate embodiments and in which.

DETAILED DESCRIPTION OF THE DRAWING

Figure 1:
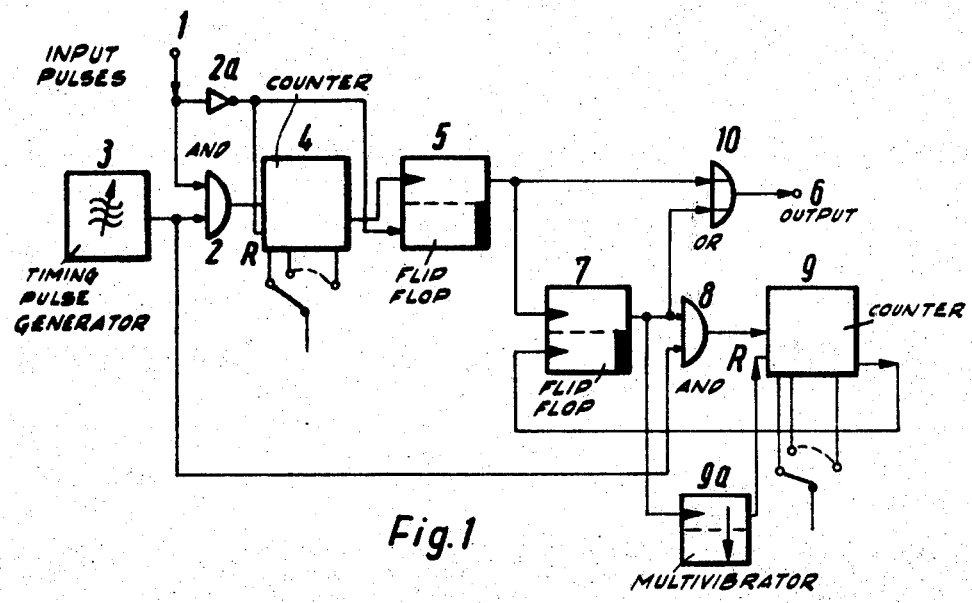
FIG. 1 shows a circuit in which the timing pulses are produced by a free-swinging generator, and, optionally by a crystal-controlled generator.

A signal or pulse $U_e$ occurring at 1 opens a gate 2, through which the timing pulses T of the generator 3 pass to the counter 4. A numerical value is preset at the counter 4. If the number of counted timing pulses corresponds to the preset value, then the counter 4 sends a signal whereby a flank-controlled flip-flop 5 is brought into a first or one (1) state. The flip-flop 5 then passes a one signal to the output point 6. The value preset at the counter 4 corresponds to the predetermined time.

The counter 4 and the flip-flop 5 are reset by the input signal $U_e$, inverted by the inverter 2a. If the duration of the pulse $U_e$ is shorter than the predetermined time at the counter 4, the pulse is suppressed. For the purpose of determining the number of pulses that exceed the predetermined time, a counter (not illustrated), provided at the output side, can be used.

If it is required to obtain the pulses again in their original widths, the predetermined time must be added again to the output pulse. This is achieved by bringing a further flip-flop 7 into the first or 1 state with the aid of the rear flank of the output signal from the flip-flop 5 and by opening an AND gate 8, through which timing pulses are passed to a counter 9. The numerical value set at the counter 9 must correspond to that of the counter 4. When this value is reached, then with the aid of the output signal from the counter 9, the flip-flop 7 is returned to the 0 state, and so is the counter 9, with the aid of the output signal of the flip-flop 7 and by way of the monostable multivibrator 9a. If the output signals of the flip-flops 5 and 7 are combined by way of an OR gate 10, there is then obtained an output pulse which corresponds to the input pulse delayed to an extent corresponding to the predetermined time.

Due to phase differences between the timing pulses and the input signal $U_e$, and due to the internal switching times, the output signal $U_a$ is shorter than the input impulse $U_e$. If the timing frequency is sufficiently high, and if a rapidly switching logic arrangement is used, this error is negligible.

By reversing the preselected numerical values at the counters 4 and 9, it is possible in a stepwise manner to vary the elimination widths or to chose pulse widths which are to be eliminated. By varying the timing frequency T of the generator, the elimination width can be continuously adjusted.

Figure 2:
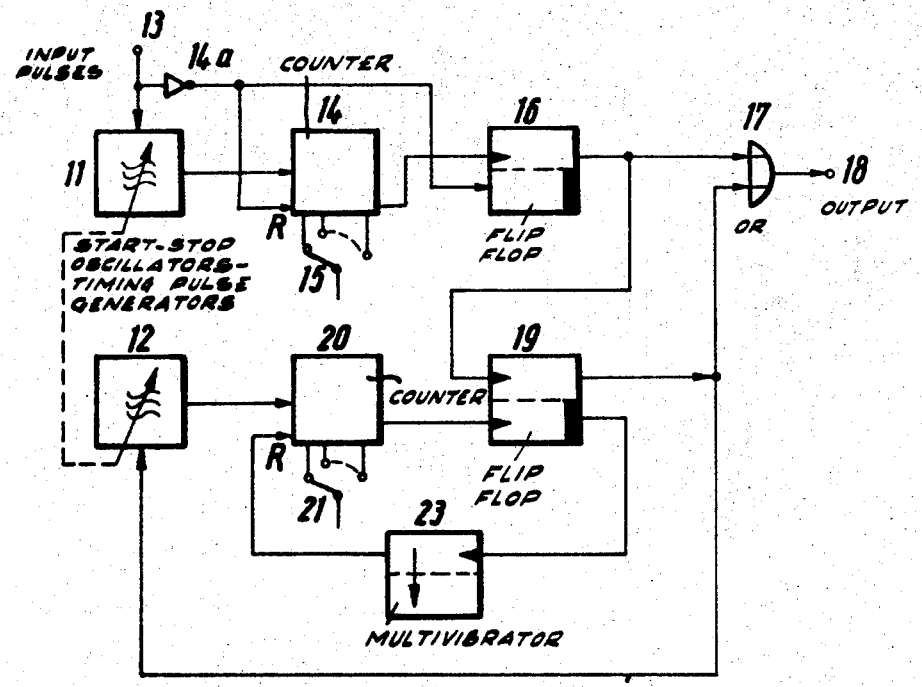
FIG. 2 shows a circuit in which start-stop oscillators are used for controlling the counters.

Errors, which occur as a result of the above-mentioned difference in phases between the input pulses and the counting pulses, can be avoided in the circuit shown in FIG. 2.

For the purpose of producing the counting pulses use is made of two start-stop oscillators 11 and 12, as they are called. The pulses to be evaluated are supplied at 13 and passed to the start-stop oscillator 11. When an input pulse is present at 13, oscillations are produced and are passed to the counter 14. When the counter 14 reaches the number preset with the aid of the switch 15, pulse is sent to one of the input points of the flip-flop 16, which thus provides the value 1 at the upper output point, this value being passed by way of the OR circuit 17 to the output point 18 of the arrangement.

If the width of the input pulse is less than the time predetermined at the counter 14, then the counter 14 does not reach that value at which it sends a pulse to the flip-flop 16. The counter 14 is previously brought to zero by the input signal inverted in 14a, while at the same time the generator 11 is blocked.

When the counter reaches the preselected condition, it sends a signal whereby the flip-flop 16 is brought into the 1 state, and a signal passes to the output point 18 by way of the OR circuit.

At the end of an input pulse of longer duration than the predetermined time, the generator 11 is likewise blocked, and the counter 14 is also zeroed. At the same time, the flip-flop 16 is brought into the other stable condition, terminating the pulse, which is applied to the upper output point of the flip-flop 16, and which passes by way of the upper input point of the OR circuit 17 to the output point 18. With the aid of the rear flank (changeover from the 1 to the 0 condition) of the flip-flop 16, the flip-flop 19 is brought into that stable condition which is characterized by the value 1 at the upper output point of the flip-flop. Thus, a 1 signal passes to the lower input point of the OR circuit 17, so that the output pulse is extended. In order to provide the length of pulse that is to be added, use is made of the generator 12 and the counter 20 and its adjusting element 21, which is set to the same value as the switch 15, since, as already mentioned, the output pulses should be available over the same width as the input pulses. Accordingly, the generator 12 is also set to the same frequency as the generator 11. The generators 11 and 12 could be tuned in the same sense in order to provide fine adjustment of the predetermined time by the switches 15 and 21.

When a 1 signal occurs at the upper output point of the flip-flop 19, line 22 starts the oscillator 12, which sends counting pulses to the counter 20. When the latter reaches the predetermined value, the flip-flop 19 is brought into the other or 0 stable condition, so that the value zero occurs at the upper output point. The output pulse is thus terminated. At the same time, the generator 12 is blocked by way of the lead 22. The counter 20 is brought to the zero position with the aid of a signal taken from the lower output point of the flip-flop 19. That signal is passed through a time-lag device, for example, a monostable mutli-vibrator 23, so that the counter is brought to the zero position only when the flip-flop 19 has safely changed over the the last mentioned stable condition.

While the invention has been particularly shown and described with reference to a preferred embodiment thereof, it will be understood by those skilled in the art that various changes in form and details may be made therein without departing from the spirit and scope of the invention.

What is claimed is:

1. In a pulse width discriminator apparatus having an input pulse source, an output signal, which is extended by a predetermined time after termination of the input pulse, and which occurs only after the predetermined time, so that no output pulses occur in the case of input pulses that are shorter than the predetermined time, and so that output pulses the width of which corresponds to the input pulses are sent when the input pulses are longer than the predetermined time, the improvement comprising:
   A. a timing pulse generator,
   B. a first counter,
   C. means to transmit timing pulses to the first counter during occurrence of input pulses, and means responsive to the first counter for commencing an output pulse after a presettable number of timing pulses is counted by the first counter,
   D. a second counter which can be preset to the same number as the first counter,
   E. means activated upon termination of input pulses that exceed the predetermined time for starting the second counter to also count timing pulses, and
   F. means for sending an impulse for causing an end of the output pulse when the second counter reaches the preset number in counting its input timing pulses.

2. An impulse-width discriminator according to claim 1, further comprising:
   A. a first AND circuit, having a first input point connected to the input pulse source for receiving the input pulses, having a second input point which is connected to the timing pulse generator, and having an output point of the AND circuit connected to a timing input point of the first counter,
   B. an OR circuit for passing signals to a discriminator output,
   C. a first flip-flop, wherein an output point of the first counter which sends a pulse after the presettable numerical value has been reached is connected to one input point of the first flip-flop, wherein an output signal of the first flip-flop passes to the discriminator output point by way of the OR circuit,
   D. a second flip-flop, wherein the output point of the first flip-flop is also connected to one of the input points of the second flip-flop, an output point of the second flip-flop being connected to a second input point of the OR circuit
   E. a second AND circuit having one input point connected to the output point of the second flip-flop, and, wherein the second flip-flop is reversed by way of the second counter, and wherein reversal input impulses, inverted by an inverter, are passed to the first counter as well as to the first flip-flop.

3. An impulse width discriminator according to claim 1, comprising:
   A. a first start-stop oscillator controlled by the input pulses for transmitting timing pulses to the first counter only durig times in which the input pulses occur,
   B. a first flip-flop having one input point connected to an output point of the first counter,
   C. an OR circuit for passing signals, including signals from the output point of the first flip-flop to an output point of the impulse width discriminator,
   D. a second flip-flop having an input point connected to the output point of the first flip-flop, one output point of the second flip-flop being likewise connected by way of the OR circuit to the output point of the impulse width discriminator, and
   E. a second start-stop oscillator having a control input point connected to the one output point of the second flip-flop to provide pulses to the second counter, an output point of the second counter being connected to a further input point of the second flip-flop, and a further output point of the second flip-flop being connected to a reversing input point of the second counter by way of a monostable circuit.

4. Pulse width discriminator apparatus comprising input means for receiving input pulses,
   timing means connected to the input means for transmitting timing pulses during input pulses,
   counting means connected to the timing means for producing a signal when a predetermined number of timing pulses has been counted during an inpput pulse, bistable means connected to the counting means for producing a first level in the presence of such a signal from the counting means, reset means connected at its input to the input means and at its output to the counting means and to the bistable means for resetting the counting means and setting the bistable means to a second level upon termination of an input pulse, and output means connected to the bistable means for producing an output during the first level produced by the bistable means.

5. The apparatus of claim 4 wherein the bistable means is a first bistable means, and further comprising a second bistable means connected to an output of the first bistable means for beginning a one level when the first level changes to the second level, second counting means connected to the second bistable means and to the timing means for counting timing pulses while the second bistable means is in the said one level, and the second counting means having further connection to the second bistable means for changing the second bistable means to a second condition to produce another level when a predetermined number of timing pulses is counted by the second counting means, and wherein the output means has gate means connected to the first and second bistable means for producing an output during the first level and said one level.

6. The apparatus of claim 5 wherein the timing means comprises a timing pulse generator and first and second AND gates with inputs connected to the generator, wherein the input pulse source is connected to an input of the first AND gate, and wherein an output of the first AND gate is connected to the first counting means, and wherein the second AND gate has an input connected to the second bistable means and an output connected to the second counting means.

7. The apparatus of claim 5 wherein the timing means comprises first and second oscillating means, the first oscillating means having an input connected to the input pulse source and having an output connected to the first counting means, and the second oscillating means having an input connected to the second bistable means and having an output connected to the second counting means.

8. Pulse width discriminator apparatus comprising
A. a source of input pulses,
B. a source of timing pulses,
C. a counter connected to the source of timing pulses for counting a predetermined number of timing pulses during an input pulse and for producing a signal when the predetermined number is exceeded,
D. a first flip-flop connected to the counter for producing a first stable state during a signal from the counter,
E. reset means connected at its input to the source of input pulses and at its output, to the counter and to the first flip-flop for setting the counter and first flip-flop at zero upon termination of an input pulse, and
F. an output connected to the first flip-flop.

9. The apparatus of claim 8, further comprising a second flip-flop connected to the first flip-flop for producing a first stable state beginning at a transition from first to second state by the first flip-flop, a second counter connected to the timing pulse source and to the second flip-flop for counting a predetermined number of timing pulses when the second flip-flop is in a first state, the second counter having a further connection to the second flip-flop for changing the second flip-flip to a second stable state after counting a predetermined number of timing pulses, and an OR gate connected to the first and second flip-flops for combining first stable state outputs of the flip-flops.

10. The apparatus of claim 5 further comprising reset means connected between the second bistable means and the second counting means for resetting the second counting means to the second condition.

* * * * *